Oct. 10, 1972  G. T. BROWN, JR., ET AL  3,697,323
PRESSURE-SENSITIVE RECORD MATERIAL
Filed Jan. 6, 1971  7 Sheets-Sheet 1
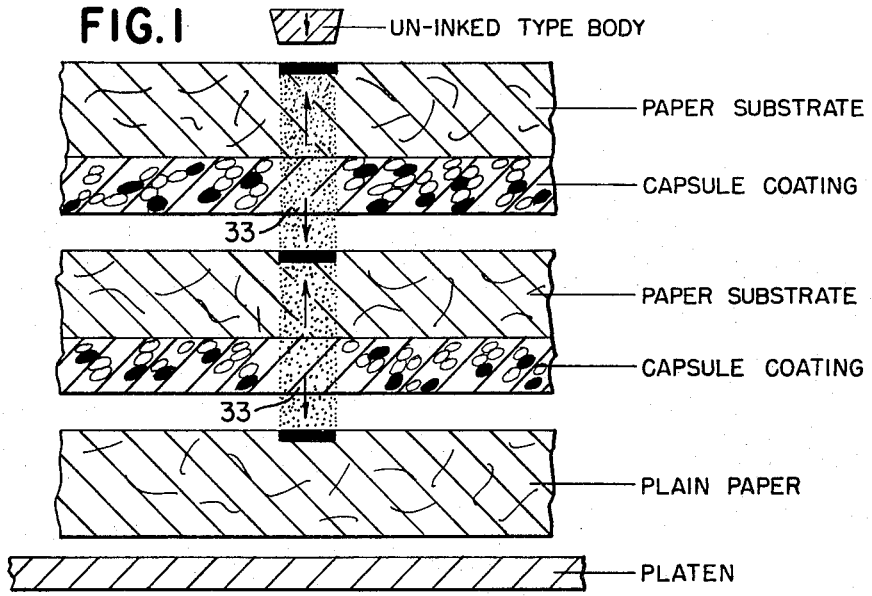
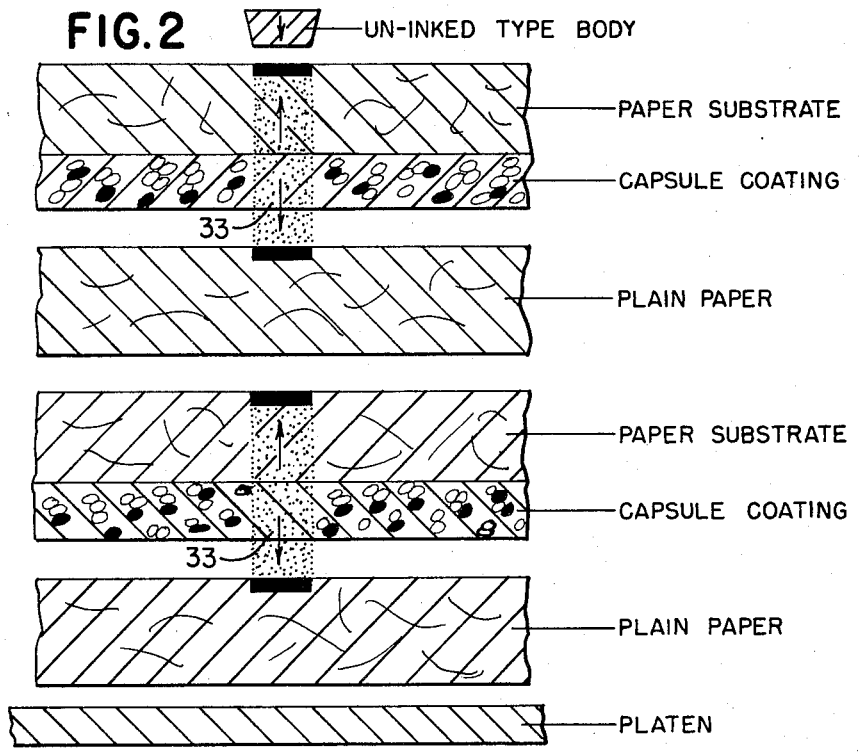
INVENTORS
GEORGE T. BROWN, JR
DONALD B. CLARK
THEIR ATTORNEY & AGENT Oct. 10, 1972   G. T. BROWN, JR., ET AL   3,697,323
PRESSURE-SENSITIVE RECORD MATERIAL
Filed Jan. 6, 1971   7 Sheets-Sheet 2
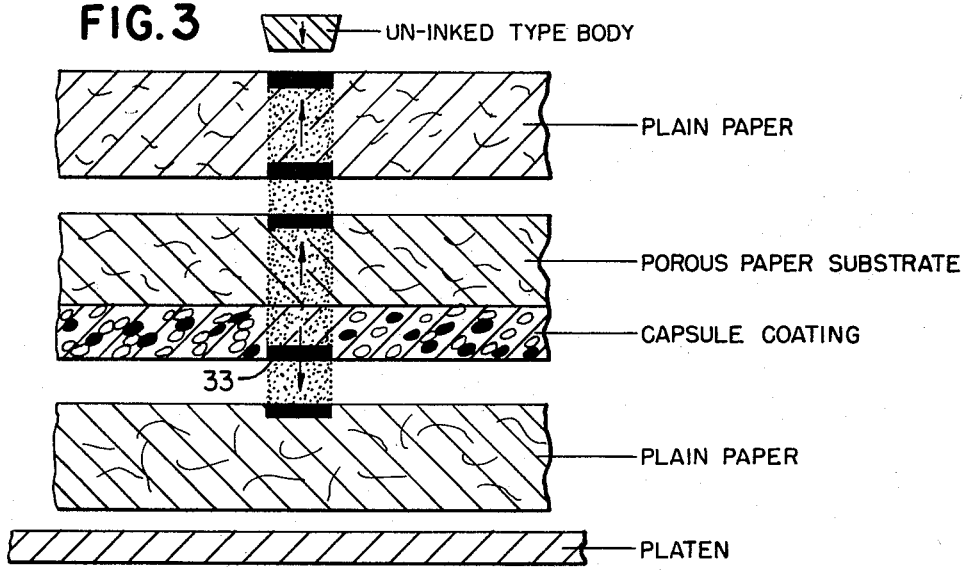
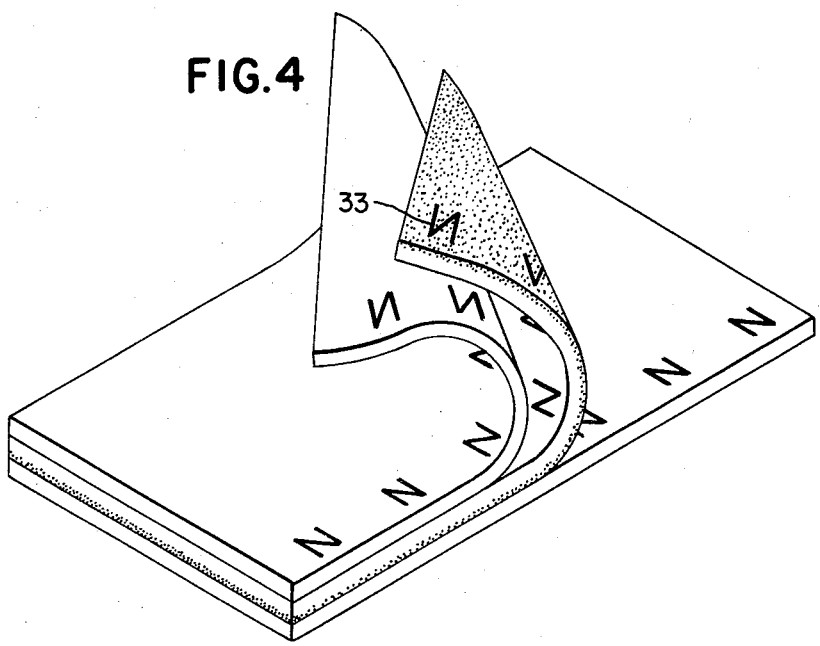
INVENTORS
GEORGE T. BROWN, JR.
DONALD B. CLARK
THEIR ATTORNEY & AGENT

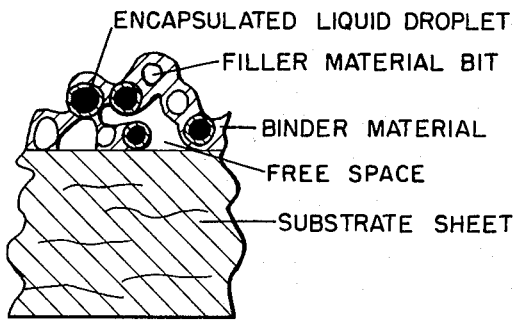
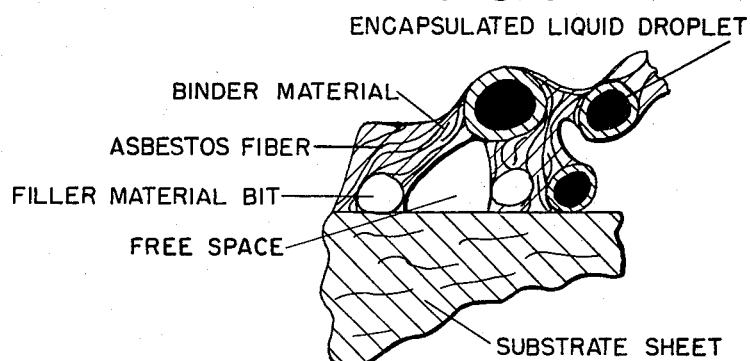
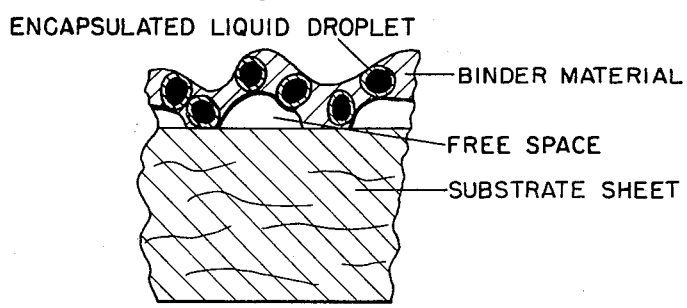
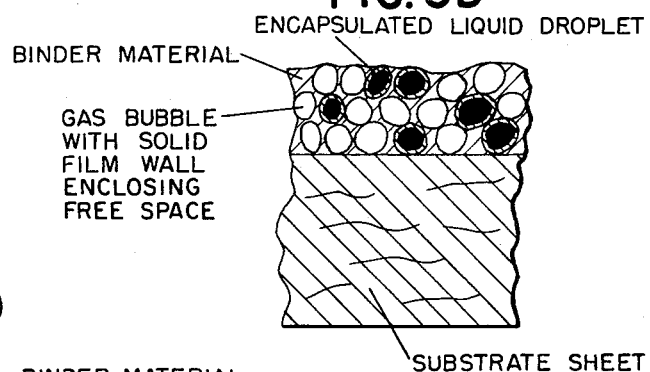
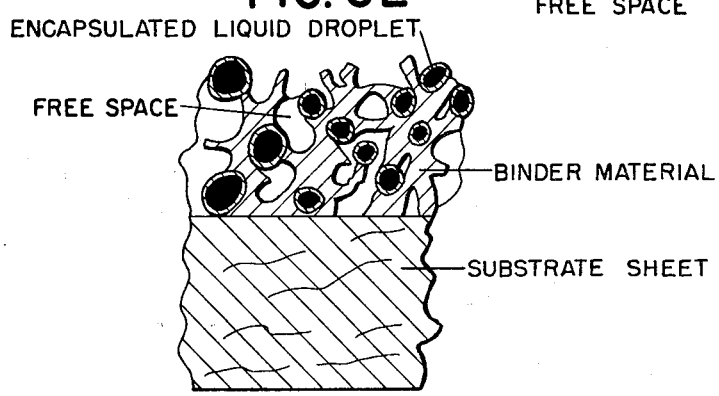

— INK-CONTAINING CAPSULE
— STARCH GRANULE BIT

⊢ 40u ⊣

CAPSULE COATING

EDGE
PAPER SUBSTRATE
REAR SURFACE

— INK-CONTAINING CAPSULE
— STARCH GRANULE BIT

⊢ 40u ⊣

|—— 40u ——|

|—— 400u ——|

FIG. II
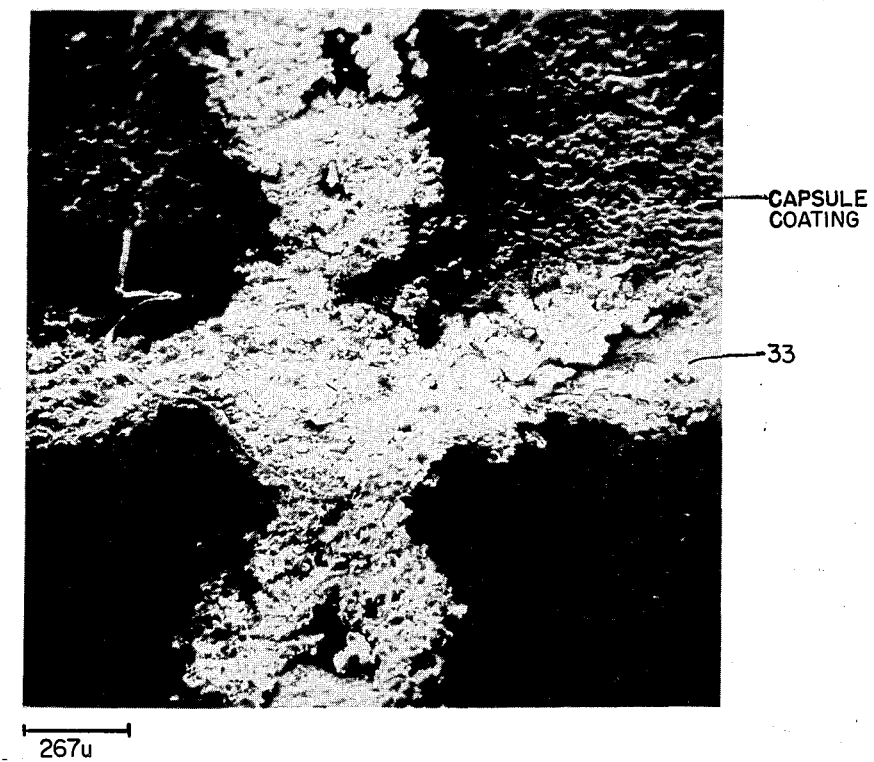

United States Patent Office 3,697,323
Patented Oct. 10, 1972

3,697,323
PRESSURE-SENSITIVE RECORD MATERIAL
George T. Brown, Jr., and Donald B. Clark, Dayton, Ohio, assignors to The National Cash Register Company, Dayton, Ohio
Filed Jan. 6, 1971, Ser. No. 104,378
Int. Cl. B41m 5/10; C04b 35/00
U.S. Cl. 117—234
37 Claims

ABSTRACT OF THE DISCLOSURE

Record material coating formulations and record material sheets coated with thick, pad-like, pressure-responsive, compressible and collapsible coatings comprising minute bits of material held firmly together on a surface of a record material substrate with binder material. Said bits of material are randomly mixed in loose-packed interspersion with each other throughout the breadth and depth of the coatings and comprise minute marking-liquid droplets which are held individually confined by organic, polymeric, film material and optionally comprise filler material particles occupying part of the space between the loose-packed marking-liquid droplets. Because they are loosely packed, the coatings are crushable in two stages or degrees in that they yield to weak pressures, such as those associated with careless handling, by being compressed and packed to a first stage without release of marking liquid, and collapse under greater applied pressure associated with printing or writing to a second compressed state to yield marking liquid in a pattern conforming to the printing or marking pressure pattern applied.

---

Figure 6:
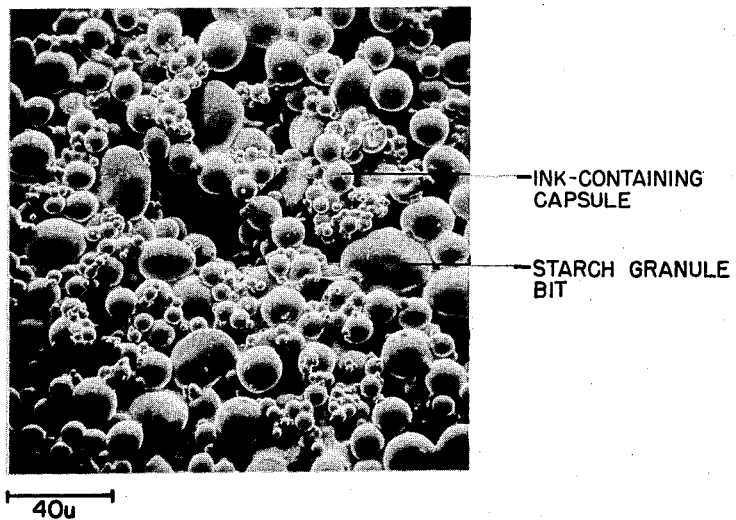

This invention relates to record sheet material having on a surface an apparently dry, thick, pad-like coating which yields to weak applied pressures such as those associated with careless handling by being compressed and packed to a first stage without release of marking liquid and which collapses under greater applied pressures associated with printing or writing to a second stage to yield marking liquid conforming to and representative of the printing or marking pressure image applied. This coating, crushable to two stages or degrees, comprises particles or bits which are at least in part minute marking-liquid droplets, loosely packed, randomly interspersed in and held by binder material in the compressible and collapsible structure, the marking-liquid droplets being confined in polymer film wall material, either as droplets contained in a continuous emulsion film (dried by vehicle evaporation or set by gelling, chemical or thermal treatment or by in situ polymerization) or as droplets contained in individual minute capsules. The interspersed bits may further comprise minute filler material particles occupying part of the space between the loosely-packed marking-liquid droplets. Said interspersed bits, in the thick, loose-packed structure of the coating, can and do undergo considerable rearrangement by packing displacement and compression before the confined droplets of marking material are released whether by rupture of capsules or emulsion film material remnants.

Heretofore, pressure-responsive record sheets, bearing liquid-ink-containing-capsule or dried emulsion coatings have largely depended not on thick compressible film structures as is the case herein but particles or buffers, known in the trade as "stilts," to protect the capsules from accidental rupture and ink-release. Such coatings are taught and claimed in U.S. Pat. 2,711,375 of R. W. Sandberg, and in the applications for U.S. patents, 814,336 of R. D. Chaney filed Apr. 8,1969, and 774,260 of B. W. Brockett et al., filed Nov. 8, 1968, now U.S. Pat. 3,617,334. The stilt materials of those inventions were designed, as the name implies, to project above the plane of the isolated droplets in the coat and protect the droplets from casual external forces. The coatings of the known art, where capsules are involved, have generally, in practice, been monolayers, composed of randomly mixed capsules and larger, projecting stilt particles. Such coatings were not always restricted to monolayers but were sometimes shown as several droplet-diameters in thickness. However, even thick coatings in the prior art were essentially bound into a solid matrix without provision for loose-packing to give free space between the coating particles for pressure-induced rearrangement by compressive movement. That is, in the prior art coatings it was not necessary to compress and collapse the structure of the coating in order to bring pressure to bear on the capsules or droplet-confining films to rupture them. It was only necessary to push aside, or bend, or break the projecting stilt particles, which acted as discrete mechanical buffers, in order to press down on the isolated droplets. Because of the general acceptance of this stilt-type of protective method, the trend in the trade has been toward ever thinner paper coatings with smaller and smaller capsules requiring ever improved wall integrity.

It is an object of this invention to provide pressure-responsive transfer coatings for record material that will allow the use of more and larger confined liquid-ink droplets to supply copious quantities of ink for transfer. It is a further object of this invention to make such coatings of low density so that, when dried, although thick, they are of relatively low weight for a given thickness. It is a further object of this invention to make pressure-responsive coatings with a built-in ink-releasing pressure-threshold which may be varied at will by varying the coating formulations without significantly changing attainable print intensity in use.

It is a further object of this invention to make a pressure-responsive paper coating that so-holds and protects the ink droplets or ink-droplet-confining capsules from environmental pressures that even droplets poorly isolated by polymer wall material are essentially smudge-proof.

Further, it is an object of this invention to incorporate the coatings of this invention, that allow the use of larger "juicy" capsules, into business forms that take advantage of the copious quantities of ink now incorporatable in the novel paper coatings without danger of smudging.

The above objects have been fully met by the thick pad-like paper coats of loosely-packed bits disclosed herein.

The coatings of this invention, when bound upon a surface of a convenient substrate such as a paper sheet, provide pressure-responsive, liquid-ink-containing record sheet material which yields said ink as a visible mark on the far surface of said same sheet and also make it available for transfer to an adjacent surface of a second sheet of record material in response to applied marking pressure which causes the collapse of said coatings and release of the ink droplets from the confined condition to a condition of forced and turbulent flow. Upon pressure release, the ink is impelled from the impacted area of the coating through the pores of the coating and into the pore structure of the sheet for viewing on the far, uncoated, surface of said sheet and is also available by transfer from that sheet to other sheets in a stack of sheets in a pattern corresponding to the marking-pressure pattern. The transfer of ink to other adjacent sheets may be directly from the coating to an underlying receiving sheet or also (if the substrate of the coated sheet is sufficiently porous and thin and if sufficient ink is supplied in the coating) from the uncoated side, through the supporting substrate, to an overlying receiving sheet. When the latter situation exists so that ink transfer occurs in both directions to give prints on both overlying and underlying receiving sheets, the result is the production of three useful, printed sheets from a single coated sheet.

The binbing of the confined ink droplets into a specially-structured compressible pad-like coating which may further include filler material particles is for the purpose of preventing smudging, the accidental release of the ink-droplets by pressures of lesser magnitude than writing, typing or printing pressures.

The confinement and individual isolation of the liquid ink droplets in polymer film material is preferably accomplished by micro-encapsulation procedures, wherein the individual liquid ink droplets are wrapped with a liquid solution of organic, polymeric film-forming material that is subsequently hardened to make the solid-walled microcapsules having liquid-ink core material and polymeric film walls.

For pad-like coatings, which include liquid-ink droplets, to effectively operate according to the precepts of this invention, they must be thick enough and loosely enough packed in the dried state to allow appreciable compression before ink-releasing pressure force can be brought to bear on the confined droplets. Coatings that so-function have been found experimentally to generally be about two or more droplet-diameters in thickness.

When the bits of material in the coatings of this invention are referred to as being "loose-packed," it is meant that there is free space within or between the bits such that under pressure the bits can deform or move into an arrangement of lesser volume. These separating free spaces may be of the open, irregular type such as air channels, tunnels, interstices, pores, gaps and cavities, or they may be at least in part enclosed, spheroidal spaces, such as the enclosed spaces of gas-filled intact, solid-film bubbles. Free space, for compressibility, collapsibility and distortability of the dried coating matrix, is essential, and coatings having both types of available free-space are exemplified here. The open, irregular, free-spaces are generally introduced into the coating structure during drying, by air-replacement of the evaporated slurry vehicle, thereby leaving free and open the space between the bits which was originally occupied by the slurry vehicle before drying. The enclosed, spheroidal free spaces are readily introduced into the coating structure during its formulation by including among the filler bits, in the wet formulation, gas bubble wall material wherein the bubble walls are solid or potentially solid film walls which remain intact in the drying coating but are readily collapsible under pressure.

Film material as the wall-material of gas bubbles may be introduced into the coating matrix as filller material bits or parts of filler material bits, as will be seen from the examples herein, by a number of different methods. Pre-formed gas bubbles may be added to the coating formulation by adding foamed bits such as foamed, minute, polymeric bits which may be bound into the matrix with added binder material. Alternatively, pre-formed gas bubbles, such as hollow, glass microspheres or hollow, polymeric-film material microspheres may be added and similarly bound with added binder material. Another, particularly simple method involves the use of a polymeric-film-material binder solution as the liquid phase of the coating slurry. Air, or other gas may be whipped (or otherwise introduced) into the liquid polymeric-film-material binder so that upon drying or setting, the polymeric-film-material binder acts both as binder and as gas-bubble wall-material. Such film material, which encloses gas to make bubbles is thus viewed as made up of firmly bound-together filler material particles that provide available free space within its own structure and thus provide boundary-supported space between the widely dispersed ink droplets. Filler material film that is the wall-material of gas-filled bubbles is considered and included here among filler material bits even when the film material forms a matrix which is continuous, in the sense that the wall-material of a solid foam is continuous, because the filler material film behaves in compression as if made up of widely spaced bits or particles located at the centers of the spheroidal air-spaces.

From the preceding discussion of the term "loose-packing" of bits as used herein it may be seen that those bits which are isolated ink droplets must on the average be relatively widely dispersed and separated from each other by free and available space so as to allow movement and close-packing of the isolated ink droplets without rupture of the droplet-isolating polymer film. In practice, the distance separating neighboring isolated ink droplets should be on the average, about one average droplet-radius or more. Those bits which are filler material particles, if used to stiffen the wet formulation and give it and the dried coat bulk, must be interspersed with the isolated ink droplets and must be so chosen and distributed as to not fill up, with solid material, all or substantially all of the available free space between the droplets. Thus solid incompressible filler material bits must be widely separated by free space just as the isolated ink-droplet must be. However, filler material bits that incorporate available free space in their internal structure may be situated, in the dry coat, correspondingly closer to neighboring bits. For instance, filler material bits may be packed in these coatings as close to each other as possible (fully packed), provided such bits include gas so as to make bubbles having walls which are readily collapsible to allow movement of the isolated ink-droplets without the release of said ink. Thus, from a practical and operational viewpoint, all the coatings disclosed herein are described as being of loose-packed structures since in all cases (1) the isolated ink-droplets are widely separated, (2) there is free space available in the coating structure for the pressure-induced close-packing of the isolated ink-droplets before effective pressure can increase enough to bring about ink release.

The requirement as to loose-packing of the droplets can be readily met by the use of coating formulations which show no substantial difference in volume between the wet state, as coated, and the dry state. The coating thickness and loose-packing of the coating material bits in the coatings of this invention is the feature which gives these coatings their advantage over coatings in the known art. Liquid-ink-containing paper coatings of the kind used in the "carbonless carbon paper" art have heretofore, as far as is known, been "pre-collapsed" or shrunken coatings, that is, coatings which markedly decrease in volume and thickness during the drying operation. This decrease in volume during the drying of prior art coatings gave a dry coat with close-packed bits which together with the binder material constituted a substantially solid incompressible film which allowed pressure to be brought to bear on the capsules without having to first press down and collapse the coating structure.

The results of studies of Mayer rod-applied coatings made from the coating formulations of this invention are useful in illustrating the "compressibility factor" attainable by the practice of this invention. Mayer coating rods, which are wire-wound rods, are designed by their construction to meter out a wet coat of standard and reproducible thickness when used to lay a wet coat formulation down on a substrate. A No. 40 Mayer rod meters out a coating having a wet-film thickness of 2.80 mils. When the coating formulation is 50 percent solids in composition, common formulations of the known art lose about 67 percent of their wet-film thickness by slumping or leveling during drying to give a dry-film thickness of 1.04 mils. This slumping, common to prior art coatings, is due to the packing of the solids during drying into a close-packed arrangement. Such packing is the result of gravitational and vehicle surface tension forces acting on the suspended particle surfaces during the drying operation.

In strong contrast to the above results, the coating formulations of this invention are sufficiently stiff to stand up while wet and give little loss in thickness during the drying operation. When the arrowroot starch granule formulation of Example 3(b) (which contains only 32.6 percent solids) is coated on a paper substrate with a No. 40 Mayer rod, the wet-film thickness of 2.80 mils is again dictated by the construction of the metering rod. Because of the lower solids content, this coat should dry to a thickness of only 0.68 mil if the wet coat slumps by bit packing as in prior art coatings. However, a dry-film coat thickness of 2.5 mils is obtained by drying this coating, reflecting a loss by slumping during drying of only 10.7 percent. The dry-coat thickness of 2.5 mils realized herein represents a 367 percent increase over the expected thickness which would result from close packing. Thus, a thick, compressible and collapsible, loose-packed, dry coating results from the use of the formulations of this invention. The space occupied by the dispersion vehicle in the wet coating is not filled in by bit packing during drying but is left as free air space between the bits, and is available for compression-packing by scuffing and other handling pressures exerted on the record material.

Thus, the "compressibility factor" which is an essential element of the coatings of this invention may readily be seen to be real and quite large and serves to explain the otherwise-proven anti-smudge characteristics of the coated paper. The thick, loosely-packed structure of the instant coatings must be collapsed and tightly packed in the area of impact before rupturing-pressure can be brought to bear on isolated ink droplets. The instant coatings are resilient to light pressures but are irreversibly compressed under greater pressures and yield ink droplets when subjected to heavy pressures associated with printing or writing. This property of the paper coating is described in terms of its "ink-releasing pressure threshold." The ink-releasing pressure threshold is the lowest pressure that will cause the protective, loosely-packed coating structure to collapse and give ink release. This threshold may be varied at will as taught herein by varying the structural strength and thickness of the coatings.

The building-up of coating bits into a thick, compressible, and collapsible pad, as required for the coats of this invention, may readily be achieved by including a thixotropic agent in the coating formulation slurry. The inclusion of a thixotropic agent in the coating formulation slurry is particularly desirable because such agents confer thixotropy on the coating formulation so that it flows readily under stress when poured and when being spread but stands up stiffly in the wet-applied condition without slumping when not under stress, during the drying operation.

In practice, soluble or insoluble thixotropic agents may be incorporated in the coating formulations. Preferably minute particles of an insoluble thixotropic agent are included as part of the filler material bits. Such insoluble, but suspendable, thixotropic filler bit materials include microfine fibers of asbestos, particularly chrysotile fibers, and siliceous materials such as wollastonite, bentonite clay, and powdered hydrophilic silica. Alternatively, there may be added to the coating formulation, soluble gums and polymeric resins which make the coating slurry behave in a thixotropic manner while they are in solution or dispersion and which form part of the binder material after the vehicle is evaporated. Thus, in summary, the coating slurry may advantageously be made thixotropic by inclusion of an insoluble solid particulate thixotropic agent as at least a part of the filler material bits or by inclusion of a soluble or colloidal thixotropic agent as at least a part of the binder material. When a thixotropic agent is used, insoluble micro-fine chrysotile asbestos fibers are preferred.

Eligible solid filler material particles which may be used to build up useful thick coatings include insoluble thixotropic agent particles, discussed above, and various kinds of granular starch particles, cellulose fibers, polymer material fibers, granules or shards, hollow glass microspheres, expanded or unexpanded polymer micro-beads, sawdust, woodflour and other insoluble micro-fine particles, a large number of which are available in nature and commerce. The essence of the eligible filler materials is that they are particulate, minute, and relatively insoluble but suspendable in the slurry vehicle. No listing of such materials could approach completeness and would furthermore serve no useful purpose since any skilled artisan could readily choose such materials, given the teaching of this invention. Although it is not a requirement, the filler material bits used herein are themselves preferably compressible, collapsible or deformable. Most of the compressibility of the coating comes from its own collapsible, loosely-packed structure, but additional compressibility or collapsibility inherent in the bits and pieces of the coating is also desirable.

Alternatively, the thick pad-like coating of this invention may be built up without solid filler material particles simply by applying to a substrate a coating of encapsulated liquid-ink droplets, two or more droplet-diameters in thickness, together with a collapsible binder material to hold the droplets together on the substrate, provided at least a part of the binder material is a thixotropic agent to prevent coating-collapse during drying. Such a coating, without solid filler material bits, provides a compressible pad, having a high-pressure threshold for ink-release according to the teaching of this invention, but the inclusion of solid filler material particles achieves the effect more easily and effectively and is therefore preferred.

The required separation of the droplets, with or without filler material bits, may also be accomplished so as to leave free space between the droplets in the dry coats of this invention by various known gelling methods. For instance if the freshly laid-down wet film of the coating slurry is gelled prior to evaporation of the vehicle, a dry coat will result with free space voids in the space previously occupied by the vehicle. Such a gelling method, involving the gelling of poly(vinyl alcohol) solutions with certain metallic ions and alkaline vapors, is taught by Wesley G. Lowe in U.S. Pat. No. 2,455,936 which issued Dec. 14, 1948. The same gelling technique can be used on the hexylene glycol borate-"Elvanol" coacervate binder material of Example 8, below. In Example 8 the described coacervate is used as a binder but it also readily gels when treated with ammonia vapors so that it can be gelled when the wet film is freshly laid down. Evaporation of the vehicle following gelling then gives additional free space in the dried coat. Binders which have been gelled prior to evaporation of the vehicle are referred to herein as pre-set binders.

The paper coating compositions of this invention are formulated to give the thick, loose-packed paper coats described above. Although the coating slurries herein are readily pourable and are readily spreadable by common paper-coating procedures, they give a stiff up-standing coat after application. When the coating slurry vehicle is readily evaporable and the dry coat is obtained by evaporation of the vehicle, the coating composition should be stiff enough after application to maintain at least about 70 percent of its wet-film thickness while drying on the substrate.

Of course the building-up of the coating structures taught herein need not be accomplished in a single step. In fact, various useful efforts to give versatility in the making of manifold business forms may be achieved by making multiple coatings one on top of the other on the same surface of a substrate to give a thick laminated coat. To be an embodiment of this invention and have the advantages described herein, the multi-layer coating must be at least two droplet diameters thick and be compressible and collapsible due to the incorporation of free space in its structure. This requirement may be fulfilled by laying down successive thin but loose-packed coats or by laying down, among the several lamina, at least one layer which is properly thick and loose-packed.

The choice of binder material is not critical. Any binder material useful in the paper coating art may be used in the coating formulations of this invention. Thus, eligible binders are those of the aqueous paper-coating art such as hydrophilic polymeric colloids, starch, casein, poly(vinyl alcohol), carboxymethylcellulose, water-soluble or dispersible gums and paper-coating latexes; solvent-coating binder materials such as poly(vinyl acetate), poly(vinyl chloride), polyolefins, styrene-butadiene copolymer, neoprene, butyl rubber, polyurethanes, and organic solvent soluble cellulosic materials; inorganic binders such as water glass; and specialized binders such as polymerizable binders, thermal binders, spray adhesives and hot-melt binders such as waxes and polyethylene.

In this disclosure, liquid inks may be those in which a pigment is suspended in a liquid, or in which a dye is dissolved in a liquid. The dye type of ink includes dyes which normally have a color or which normally have substantially no color but may be subsequently converted to a state which the eye or a sensing instrument can readily detect. Color development in such colorless dyes may be effected by a reactant distributed in the ink-yielding sheet or in a sheet to which the released ink may migrate. Preferred in this invention, are pigmented inks such as a mineral oil suspension of micro-fine solid pigment particles such as barium titanate, zinc oxide, carbon-black, graphite, and magnetic iron oxides or other colored pigments including precipitates, lakes, and lithopones. Particularly useful and effective in this invention are ballpoint pen inks such as graphite inks comprising a mineral oil vehicle, a wetting agent, and graphite particles in the range of 0.5 micron to 1.0 micron in diameter. The inclusion of various sizes of pigment particles within the recited range gives an ink with better flow properties than one having particles of closely uniform size. The chosen pigment particle size range is within such fine dimensions that the ink, on sudden release under pressure, flows without separation of the suspended pigment from the vehicle oil. That is, the pigment particles remain suspended under the condition of forced and turbulent flow. However, once the ink has been released and deposited in a pattern, the pigment particles do tend to settle and be strained out of the vehicle as the vehicle impinges upon and is imbibed along the paper fibers and porosities adjacent to the point of deposition. Thus, the sharpness of the mark defined by the deposited pigment particles is not reduced by later pigment bleeding within the paper because the pigment particles remain or are held where deposited and only the "invisible" vehicle is so imbibed. The pigment particles represent no more than about 30 percent, by weight, of the pigment type of ink so that the ink will not be too viscous to flow readily. The vehicle is preferably a non-toxic, inert liquid which flows readily under the conditions of use and which has low vapor pressure and no hardening-by-aging characteristics, for example a light, colorless mineral oil.

The second type of ink specified for use in a dye, either colored or colorless but colorable, dissolved in a liquid vehicle which may be oily or aqueous. When a colorless, chromogenic type of dye system is used, sensitizing co-reactant material must be provided to develop the potential color of the chromogen to give a useful print. Sensitizing coreactant material in particulate or film form may be incorporated on or in paper sheets which receive chromogenic dye material from ruptured capsules including the substrate sheet which supports the chromogen-containing capsule coat. Furthermore, sensitizing co-reactant material may be dissolved in a liquid vehicle and used as an ink, contained in or on substrate sheets as capsular core-material. Co-reactant-containing capsules may be mixed with chromogen-containing capsules in the same coating formulation to provide a "self-contained" sheet. In practice, it has been found that sufficiently large and juicy capsules may be used in the formulations of this invention that the described self-contained sheet will also act as a transfer sheet in a couplet form where liquid from the two kinds of capsules—those containing chromogen and those containing co-reactant—will mix to give a visible print on the uncoated side of the substrate sheet and on the other sheet of the couplet which is a plain, uncoated and unsensitized sheet. When the co-reactant material is not provided as an encapsulated ink in the same coat which contains the encapsulated chromogenic ink, it may be applied by known methods to only those sheets or portions of sheets where it is desired to have an image appear. For instance, the colorless-dye ink may be excreted through a non-sensitized sheet, which acts merely as a transporting medium, to a sheet on its other side, which is sensitized to develop or to assist in the development of the color. A number of such systems may be produced by arranging the facing of sheets in a stack to accommodate any business need, and any such system using liquid inks is considered to be within the scope of this invention, provided that the other qualifying limitations are present.

A useful feature of thick laminated coatings, having more than one coat applied to a single surface of a substrate sheet in separate coating steps as described above, is that one of the coats may incorporate one color of ink, say black ink, and a second coat may incorporate another color of ink such as red ink. Thus, released ink migrating within the substrate sheet may be of a different color than that migrating from the coating to a second receiving sheet so as to give a black print, for example, on the uncoated surface of the coated sheet and a red copy on a second sheet. The positions of the coats, one above the other, gives the contained inks a directional advantage when migrating such that one ink predominates in the upward flow and the other pink predominates in the downward flow. Some mixing of the colored inks, migrated chiefly in opposite directions, is generally observed, which mixing may be made use of to give different hues or, alternatively, an intermediate layer of ink-resistant material (such as poly(vinyl alcohol) for oil-based inks) may be coated between the coats to give substantially unmixed colors, flowing in opposite directions.

One particular advantage associated with all of the thick pad-like coatings described herein, is their receptivity to glues. The porosity of the loose-packed coatings make them all absorbent toward adhesive materials. Some of the disclosed coatings are receptive to hydrophilic adhesives and some to hydrophobic adhesives, the choice of which is readily made by the artisan. This receptivity to glues allows business forms and continuous forms to readily be made with the coated record materials of this invention. The coated sheets described herein may be readily glued together in any order, including coated face to coated face and uncoated face to coated face.

Of the drawings, FIGS. 1–4 show various embodiments of the record systems of this invention. FIGS. 5A, 5B, 5C, 5D and 5E show, diagrammatically, the structures of the thick coatings of this invention. FIGS. 6–11 are electron photomicrographs showing the detailed structure of the coatings of the invention. FIGS. 6–9 are different views of the same coated sheet.

Inasmuch as the electron photomicrographs (FIGS. 6–11) and the greatly magnified structural diagrams of the coatings of this invention (FIGS. 5A–E) help in understanding the operation of these coatings, FIGS. 5A–11 will be discussed before FIGS. 1–4 which show some of the ways these coatings can be used in records systems.

FIGS. 5A–E are greatly magnified, diagrammatic, cross-sectional views of different embodiments of the coated sheets of this invention.

Figure 7:
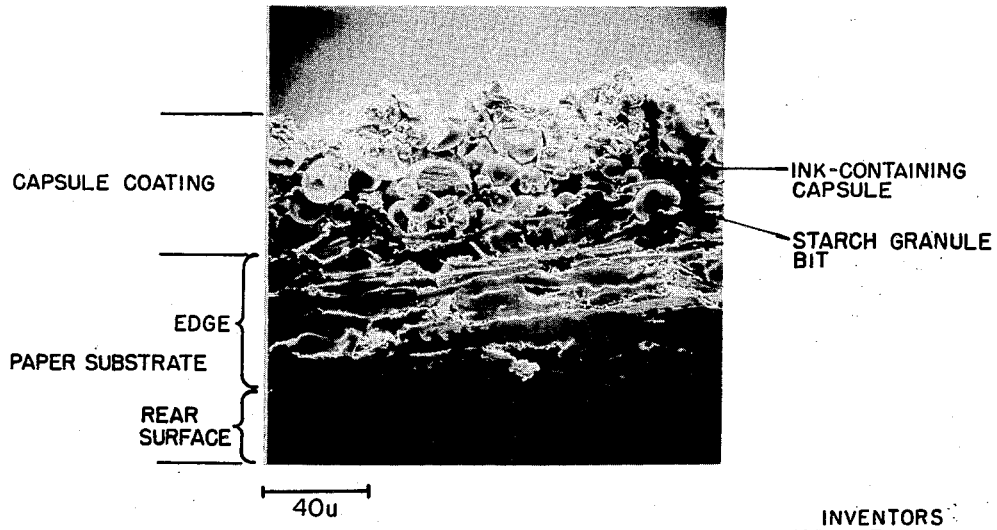

FIG. 5A shows the preferred embodiment of this invention wherein the compressible and collapsible coating comprises encapsulated ink droplets, filler material bits (such as starch granules or gas bubble wall material) and binder material. The preferred coatings also include, among the filler material bits, a thixotropic agent, which is shown in FIG. 5B (asbestos fibers) but is not shown in this figure and which is not discernible in FIG. 7, a photomicrograph of the same embodiment. The free spaces, visible in FIG. 5A and FIG. 7, are a necessary feature of this invention.

FIG. 5B is a diagrammatic representation of FIG. 5A, viewed at higher magnification to show finer structural characteristics of the coating matrix in the preferred embodiment wherein a thixotropic agent, specifically asbestos fibers, is included. The area of FIG. 5A representing "binder material" may be seen, in the preferred embodiment represented by FIG. 5B, to be a dried residue of asbestos fibers and binder material, the asbestos fibers having been wetted by binder material solution prior to evaporation of the coating slurry vehicle.

FIG. 5C shows a coated sheet identical to that shown in FIG. 5A except that in this embodiment the filler material bits visible in FIG. 5A are omitted. As a practical matter, the formulation used to build up the coating shown in FIG. 5C will preferably include a thixotropic agent which may be part of the soluble binder material or which may be fine asbestos fibers as shown in FIG. 5B but which are not visually discernible at the magnification shown in FIG. 5C.

FIG. 5D shows another embodiment wherein the filler material is the wall material enveloping minute gas bubbles, such as air bubbles, having intact but readily-collapsible walls of solid-film material. In this embodiment the collapsible-bubble wall material filler bits provide the required free space to give the coating its compressible and collapsible character. In this embodiment the film material used to form the gas bubble walls also generally serves as the binder material.

FIG. 5E depicts a reticulated gas bubble coating wherein the bubble walls such as those shown in FIG. 5D have been removed except for their planes and lines of mutual intersection.

Figure 10:
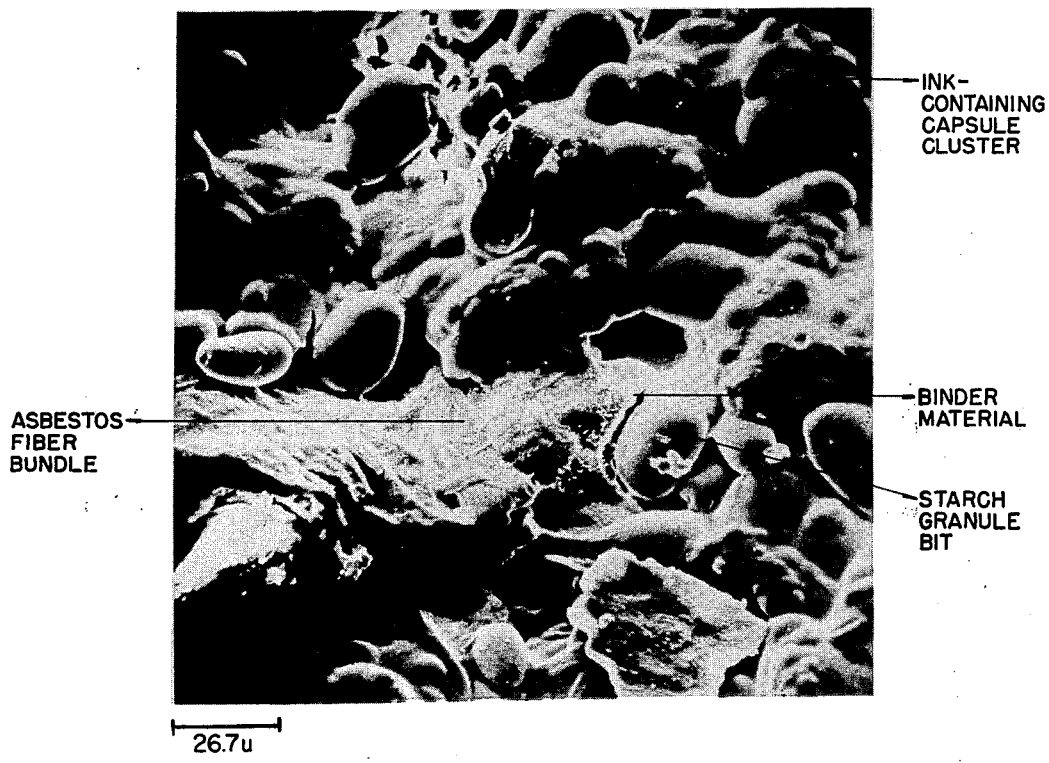

FIG. 6 is an electron photomicrograph of the surface of the coating of this invention wherein the interspersion of capsular and protective filler material bits (arrowroot starch granules in this figure) may be seen. Binder material, bridging and holding the bits together, is barely distinguishable in this figure but is more readily discerned in FIG. 10. In FIG. 6, the capsules are often those containing single isolated droplets and the isolating capsular wall material is a poly(vinyl alcohol) resorcinol-formaldehyde material, the capsules being prepared according to the teaching of Robert G. Bayless and Donald D. Emrick, as disclosed and claimed in application for Letters Patent, U.S. Ser. No. 701,124 filed Jan. 29, 1968 now abandoned. In FIG. 10, the capsules are present as capsule clusters with gelatin-gum arabic complex wall material, prepared according to U.S. Pat. No. 3,041,289 which issued June 26, 1962 on application of Bernard Katchen and Robert E. Miller. FIG. 10 incidentally also shows some asbestos fiber material which is readily visible in this case because a bundle of asbestos fiber, not completely separated into its component fibers, happened to fall in the area of this view. In practice, asbestos fiber material, available commercially, should be well beaten, as by vigorous stirring in an aqueous suspension, to separate asbestos fiber bundles into individual fibers.

Of particular importance in envisioning the coatings and record materials of this invention is FIG. 7, a cross-sectional photomicrograph showing the remarkable depth of the piled-up bits that constitute the coating. In this view, the entire sheet of record material may be seen to be about 100 microns thick with the coating and the substrate each being about 50 microns thick, the coating depth being at least about 5-bit diameters.

Figure 8:
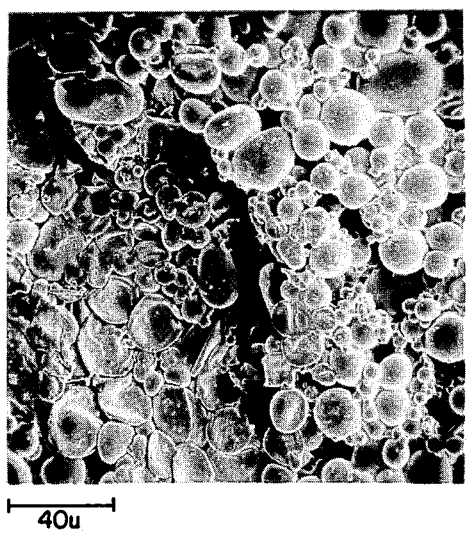
Figure 9:
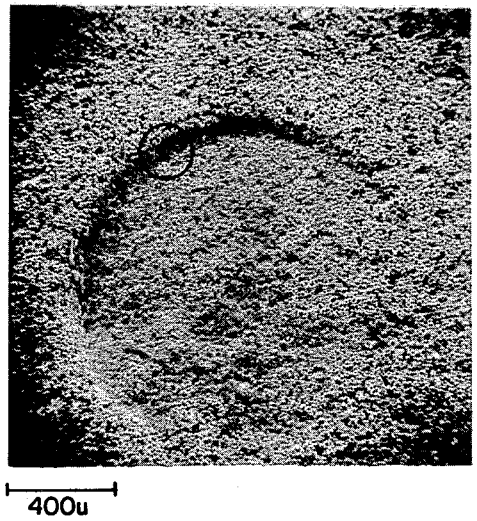

FIG. 9 is another surface view of the coating of FIG. 6, which has been depressed by a circular type-body, applied at a slight angle to the normal so as to give a canted semi-circular depression. The thickness and collapsibility of the coating are readily discernible in this view. The encircled portion (at 11 o'clock) has been enlarged an additional 10 diameters and appears as FIG. 8. FIG. 8 has been rotated 90 degrees clockwise from its position in the encircled portion of FIG. 9. In FIG. 8, crushed capsules and crushed and deformed starch granules may be seen in the central depression and undamaged bits may be seen at the edge of the depressed circle.

FIG. 11 shows a surface view of a coating which has been struck from the substrate side with a typewriter "X" character. The struck portion of the coating when viewed stereoscopically with a mating view can be seen to consist of two intersecting valleys created by the actual tearing out of and transfer of portions of the coating. When the coatings of this invention are struck with less impact, the coating is merely crushed to give ink-release without the tearing out and transfer of substantial portions of solid material. It should be noted that the "X" of FIG. 11 is not actually white on black when viewed in visible light, but rather black on black. The light and dark areas in the scanning electron photomicrograph represent areas of different electron density, not areas that are visually light and dark. This black-on-black character print is designated 33 and is also so designated on the diagrammatic representations of business form prints in FIGS. 1–4.

FIGS. 1–4 are enlarged, diagrammatic representations of some practical embodiments of the novel record sheets of this invention. Other combinations of coated sheets and plain paper will be apparent to one skilled in the art but the combinations shown here serve to point out various modes of practicing this invention and demonstrate the efficiency and versatility of the coated sheets of this invention.

FIGS. 1–3 are cross-sectional views of novel-coated paper sheets assembled in business form records systems. In use the sheets are arranged, of course, mated in a stack, in face-to-face contact, without the air space separating them as shown here for purposes of illustration. Sheets mated in face-to-face contact may be attached to each other in practice or used as a loose stack. Packing bits in the coatings are represented by white circular areas and ink-containing capsules by black circular areas.

FIGS. 1–3 show broken-capsule zones in the coatings, areas of ink flow, and the useful character prints that result from striking the top sheet with an un-inked type body. The unsurfaced released ink is shown as a stippled column running through the sheet with an arrow indicating the direction of flow from the area of broken capsules. The terminus of the stippled column at a surface of a sheet is shown as a solid black block-line to indicate that the presence of the ink at or near a sheet surface is visibly apparent at the surface and is useful as a character pattern. The terminus of a stippled column at a coated surface is designated 33 to show the presence of a character, similar to the block-lines at other surfaces, which is not useful for visual reading in the preferred embodiment of this invention because in that embodiment the coating is black, and 33 therefore represents a black-on-black character print. When the coatings are colorless due to the use of colorless chromogenic ink and when sufficient amounts of colorless chromogenic inks are used therein, the pad-like coating may show a sponge-effect and suck enough colored ink back from the color-initiating receiving sheet to give a distinct and useful character at position 33.

FIG. 1 represents a stack of coated sheets with a single plain-paper bottom sheet. Note that the block-line character on the second sheet is formed by ink from two sources, that which has flowed up from the coating of the second sheet and that which has flowed down and been transferred from the coating of the first sheet. Thus particularly intense prints are made on the second sheet and succeeding sheets down in the form which receive ink from both above and below. Additional second sheets may be added at will to give a total of about eight to ten sheets between the top sheet and the bottom sheet so as to give ten to twelve reasonably good imaged sheets. The number of additional coated sheets that can be inserted in the stack to give additional legible copies depends on the weight and stiffness of the paper substrates as well as the total ink-load in the coatings, the force with which the type body strikes the top sheet and other factors; however, a business form that yields twelve legible copies at a single typing stroke is not difficult to achieve with the type of record sheet coatings disclosed herein.

FIG. 2 depicts a business form stack in which coated sheets alternate through the stack with plain paper, more or less like a standard carbon paper business form stack except that the system utilizes the special back-flow of ink within the coated sheet so that the transfer sheet which will evidence a legible copy on its uncoated surface also constitutes a usable copy. The top two sheets and the bottom two sheets in FIG. 2 as separate pairs constitute a transfer sheet and receiving sheet combination known as a business form couplet. In this system, the down-in-the-form characters are not enhanced by ink flow from two adjacent coatings as in the form of FIG. 1, so this system does not allow the making of as many legible copies as does the system of FIG. 1. However, it is more economical than the FIG. 1 system and still allows the making of up to about twelve legible copies in a stack.

FIG. 3 shows the most economical business form structure utilizing the coatings of this invention. Here, three legible and useful copies result from the use of only one coated sheet. The manifold pack of FIG. 3 is called a triplet form. The released ink in this form is supplied in such copious quantities by use of larger or more capsules that useful characters appear not only on the paper surfaces immediately above and below the ruptured spot on the cotaing but also on a top sheet above the coated sheet. This effect is most readily made use of when the paper web materials in the form are porous and relatively thin. The system is further illustrated in perspective in FIG. 4.

When the papers in this system are very thin and the coating is very juicy, the triplet form can be usefully expanded by the addition to the bottom of the form of additional plan sheets of paper so that up to five or six sheets may be imaged by capsule rupture on a single coated sheet.

An equivalent variation of the triplet form shown in FIGS. 3 and 4 conssits of the same three sheets shown therein arranged in a different order. If in FIG. 3 the top sheet is designated "A," the coated sheet "B," and the bottom sheet "C" so that the depicted arrangement reads A–B–C from top to bottom, an equivalent triplet form is represented by the top-to-bottom arrangement: B–C–A. In the depicted arrangement, A–B–C, legibility and print intensity are of course enhanced by increasing the ink supply in the coating, and by using thin, porous, ink-transmitting sheets as sheet A and as the substrate sheet of sheet B. In the equivalent arrangement, designated B–C–A, the thinness, porosity and ink-transmitting ability of sheet C and the substrate sheet of sheet B affect the legibility and print intensity of the transferred images.

The triplet construction of FIGS. 3 and 4 also allows particularly versatile construction of business forms when the ink in the coating of sheet B is colorless chromogenic ink. In this case for images to appear for viewing on the surfaces indicated in the figures, those surfaces must be sensitized with co-reactant materials to develop the color of the chromogenic ink. Any sheet surface or part of a sheet surface may be left unsensitized where it is desired to have no image appear as a result of pressure-rupture of the capsules. Thus in the arrangement B–C–A discussed above, sheet C may be left unsensitized so that a message pressure-printed on sheet B will only appear on sheets B and A. Obviously, any part of sheets A and C and the uncoated surface of sheet B may be left unsensitized in either arrangement A–B–C or B–C–A so that only the sensitized parts will reveal a print as a result of pressure printing.

A useful modification of the business forms of FIGS. 1–3 consists of the insertion, either loose or as part of a bound form, of a plain sheet of paper or letterhead paper between the top sheet shown in the figures and the type body. The use of an inked type body (or an intervening inker such as a typewriter ribbon) would then give an additional representation of data with each of these forms.

It should also be noted that the thick pad-like coatings of this invention are sufficiently firm and strong to be self-supporting so that the formulations of this invention may be coated on a casting belt substrate and then, after setting or drying, be peeled from the substrate to give a pressure-responsive cast film. Such cast film will yield ink from both faces and may be incorporated in business forms as the equivalent of double-faced carbon papers.

Among the advantages of the thick transfer coatings of this invention is the narrowness and sharpness of transferred characters. Transfer coatings of the known art, which involve the pressure-release of encapsulated ink, generally give "down-in-the-form" transfer prints which are substantially wider in line than either the original or first copy print. The transferred ink patterns obtainable with the coatings of this invention increase only slightly in width from one copy to the next down through a stacked business form. For instance, a standard impact print character on the fourth copy (fifth sheet) of a manifold business form incorporating the coating of the Sandberg patent (U.S. 2,711,375) shows a 50–60 percent increase in width over the width of the corresponding character on the first copy or second sheet. The same test on papers coated according to the teaching of this invention and arranged as shown in FIG. 1 showed an 18–25 percent increase in the width of the character on the sixth sheet compared to the width of the character on the first sheet. Although this phenomenon is not completely understood, it is thought to be the result of the different capabilities of the compared types of capsular coatings to laterally transmit effective impact pressures. It is thought that the known-art sheet of Sandberg, which is a firmly bound, relatively incompressible construction of close-packed bits, transmits impact pressures more effectively over a wider area, and, furthermore, that the capsules which are immediately next to but not directly under the area of impact are also readily broken because the close-packing of the known-art coat leaves no room for those neighboring capsules to move out of the path of the ongoing pressure front. Whereas the capsules in the instant coating, occupying a similar position at or near the edge of the on-going type-impact pressure front, readily escape rupture by lateral displacement into the many available voids between neighboring bits. Furthermore, the collapse of the instant coating under impact breaks the connecting binder links between neighboring bits and effectively inhibits the lateral fanning-out of the pressure front.

When the thick, collapsible coatings herein described are used as part of record material transfer sheets, the intensity of a transfer print made by an impact sufficient to break all the capsules has been found to be independent of the thickness of the coat and of the nature and amount of inert particulate materials include in the coat. The print intensity has been found to be almost entirely a function of the amount of flowable liquid ink present per unit area. In general, when the materials of this invention are formulated as taught herein, differences, from one formulation to another, in the amount of liquid ink absorbed by the binder and filler material is negligible during capsule rupture and ink transfer. That is to say in impact-printing use, for any given substrate and standardized use-situation a substantially constant transfer print intensity may be expected to result from the use of a constant weight of a standard ink per unit area of substrate despite variations in the amounts and kinds of binder material and filler material particles included in the coating matrix. Thus, a practitioner in the paper-coating art can make up an exemplary coating formulation and experimentally determine the weight of ink per unit substrate-area needed to give a print of the desired intensity on that substrate without concern for smudge-resistance. Once the weight of needed ink is determined, more or less binder and filler materials can be added to the formulation, depending on whether more or less smudge-resistance is desired. If the finally-determined formulation, having the desired smudge-resistance, is then coated onto the given substrate at such a coating-weight as to give the desired ink weight per unit substrate-area, the desired impact print transfer intensity will result, despite alterations made in the formulations with regard to smudge-resistance.

On the other hand, the intensity of a rolling-pressure or frictional pressure transfer print, such as that made by a calender roll or handwriting pressure, is a function of the weight of ink present per unit substrate-area as well as the amount of binder and filler materials used and the final thickness of the coat. The intensity of transfer prints, which result from rolling-pressure or handwriting, is thus seen to depend on the same factors that determine smudge-resistance. Those coats which give the best handwriting transfer intensities are the most readily smudgable.

Since smudging forces and handwriting forces are similar in nature it is not surprising that the intensities of marks produced by them are dependent on the same factors. The great advantage of the coats of this invention is in impact printing where the collapsible structure, with its built-in ink-releasing pressure threshold, gives a transfer print whose intensity is not dependent on all the same factors that smudgability is dependent on. The coatings of this invention are believed to be the first to effectively separate by design the factors on which impact-print intensity and smudgability are dependent. It is no longer necessary to sacrifice smudge-resistance to gain increased impact print intensity.

When colored-dye or pigmented inks are used herein as capsular core-material it is sometimes desirable to apply an opaque overcoat to the capsule-containing coat to mask the color of the ink capsules. Useful for this purpose are white pigments, particularly clays, and solid light-diffracting polymer foams.

The specific examples set forth below illustrate the practice of this invention but are not intended to limit it. In the examples and throughout this specification, all parts by weight and compositional percents are percents by weight, unless otherwise indicated.

EXAMPLE 1

Inks.—The following ink formulations, (a) through (r), are useful in the coatings of this invention when incorporated as the internal phase of microcapsules. Unless otherwise specified, the inks given here were encapsulated as 10 to 15 micron droplets according to procedure (a) of Example 2.

Pigment inks: Parts
(a) Carbon black _____ 4
    Azo Blue Black B _____ 2
    Sorbitan trioleate _____ 4
    U.S.P. Mineral Oil _____ 90
(b) Barium lithol red _____ 40
    U.S.P. Mineral Oil _____ 140
    Cottonseed oil _____ 20
(c) Phthalocyanine green pigment _____ 40
    U.S.P. Mineral Oil _____ 140
    Cottonseed oil _____ 20

Pigment inks:
(d) Magnetic iron oxide _____ 40
    U.S.P. Mineral Oil _____ 150
    Dispersant (lecithin, oleic acid) ____ 10
(e) Orange-red fluorescent pigment (Radiant
    Color Company, 2800 Radiant Ave.,
    Richmond, Calif. 94804, JST-300) __ 40
    Sorbitan trioleate _____ 160

Commercially available pigment dispersions and inks such as those made for ball-point pens are also useful when diluted. Available from Venus-Esterbrook Corporation, Cherry Hill, N.J., is "Fluid Graphite Ink R-5" and "Carbon Black Dispersion 597F-715" may be bought from Hilton Davis Company, Langdon Farms Road, Cincinnati, Ohio. Cities Service Company, Pigment and Specialties Division, 60 Wall St., New York, N.Y. 10005, sells a number of useful carbon black dispersions. Particularly useful are two oil dispersions of carbon black, sold by Cities Service Company as Codispersion 22R25 and Codispersion 45R13. Useful formulations for the manufacture of suitable inks by modification of commercially available pigment dispersions are as follows:

Pigment inks: Parts
(f) Venus-Esterbrook Graphite Ink _____ 100
    U.S.P. Mineral Oil _____ 100
(g) Venus-Esterbrook Graphite Ink _____ 25
    Cottonseed oil _____ 25
    U.S.P. Mineral Oil _____ 75
(h) Hilton Davis Carbon Black Dispersion _ 100
    U.S.P. Mineral Oil _____ 70
(i) Codispersion 22R25 (or Codispersion
    45R13) _____ 100
    p-Phenylphenol-formaldehyde resin ___ [1] 40
    "Admex 710" oil or ("Admex 746" oil) _ 100

[1] Optional when "Admex 746" oil is used.

Colorless dye-precursor ink.—For use in development of color on a receiving surface sensitized with acidic materials:

Pigment inks: Parts
(j) Crystal Violet Lactone _____ 3
    "Aroclor 1221" _____ 136
    "Magnaflux Oil" _____ 68

Formulation (j), above, was encapsulated with gelatin wall material, according to procedure (b) of Example 2.

Colorless dye-precursor-developer ink.—For use in development of color on a receiving surface sensitized with colorless chromogenic materials such as Crystal Violet Lactone:

Pigment inks: Parts
(k) p-Phenylphenol-formaldehyde resin ____ 25
    Xylene _____ 75

Oil-based colored-dye inks.—Satisfactory oil-based colored-dye inks were made by dissolving various commercial dyes in xylene together with resins to give body to the inks and also to decrease bleeding of transferred dye-ink on the receiving sheet. Five colored-dye inks were made by dissolving the following materials in 100 parts of xylene:

Pigment inks: Parts
(l) Brilliant Oil Blue BMN _____ 4
    p-Phenylphenol-formaldehyde resin ___ 33
(m) "Iosol Red" _____ 4
    p-Phenylphenol-formaldehyde resin ___ 33
(n) Sudan II _____ 2.2
    Acryloid B-66 _____ 11
(o) "Iosol Red" _____ 3.2
    Abietic acid _____ 3.2
    p-Phenylphenol-formaldehyde resin ___ 2.1
(p) "Zinsser Oil Soluble Green D6822" ____ 1.1
    "Acryloid B-66" _____ 11

Water-based colored dye inks.—Useful water-based colored dye inks included the following:

Pigment inks: Parts
   (q) Brilliant Green Dye _____ 3
       Glycerol _____ 75
       Water _____ 25
   (r) Escon Red _____ 4
       70% sorbitol _____ 86
       Water _____ 14

Formulations (q) and (r) above were encapsulated according to procedure (c) of Example 2.

The orange-red fluorescent pigment used here was bought from Radiant Color Company, 2800 Radiant Ave., Richmond, Calif. 94804, as Fluorescent Pigment JST–300. "Admex 710" is an epoxidized soy oil and "Admex 746" is an epoxidized tall oil supplied by Archer-Daniels-Midland Company, 700 Investor's Bldg., Minneapolis, Minn.

"Aroclor 1221" is a chlorinated biphenyl solvent sold by Monsanto Chemical Company, St. Louis, Mo.

"Magnaflux Oil" is a hydrocarbon oil with a distillation range of 370 to 500 degrees Fahrenheit sold by Magnaflux Corporation, Chicago, Ill.

"Iosol Red" is a red pigment sold by Allied Chemical Corporation, National Aniline Division, 40 Rector St., New York, N.Y. 10006.

"Zinsser Oil Soluble Green D6822" was bought from Zinsser and Company, Incorporated, Hastings-on-Hudson, N.Y.

"Acryloid B–66" is a polymer made from the esters of acrylic and methacrylic acids as described in the technical booklet entitled, "Acryloid Acrylic Ester Resins For Coatings," September 1960 edition, from Rohm & Haas Company, The Resinous Products Division, Philadelphia, Pa.

"Brilliant Green Dye," Color Index No. 662, is a water soluble Malachite Green dye sold by The Matheson Company, Inc., East Rutherford, N.J.

"Escon Red," Color Index No. 678, is a water soluble triphenyl methane magenta dye sold by Tenneco Chemicals, Inc., Tenneco Colors Division, 374 Main St., Belleville, N.J. 07109.

EXAMPLE 2

(a) Capsules having resin-reinforced poly-(vinyl alcohol) wall-material

The preferred capsules for general use in making the coated paper of this invention were prepared by a slight modification of the procedure taught as Example 8 in the co-pending U.S. application 701,124, filed Jan. 29, 1968 in the names of Robert G. Bayless and Donald D. Emrick. This procedure was used to encapsulate each of the inks of Example 1 except that of Examples 1(j), 1(q), and 1 (r).

An aqueous solution, consisting of 160 milliliters of 5 percent poly(vinyl alcohol) and 50 milliliters of 11 percent gum arabic was agitated at low speed with a Waring "Blendor" in a one-quart cup. The poly(vinyl alcohol) solution was prepared as follows: 1.5 grams of about 86,000 molecular weight poly(vinyl alcohol) characterized by having a viscosity of about 28 to 32 centipoises in a 4 percent, by weight, aqueous solution at 20 degrees centigrade, and by being 99 to 100 percent hydrolyzed (such as the material designated "Elvanol 71–30" and sold by E. I. du Pont de Nemours and Co., Wilmington, Del., U.S.A.) and 6.5 grams of about 125,000 molecular weight poly(vinyl alcohol) characterized by having a viscosity of about 35 to 45 centipoises in a 4 percent by weight, aqueous solution at 20 degrees centigrade and by being 87 to 89 percent hydrolyzed (such as the material designated "Elvanol 50–42" and sold by E. I. du Pont de Nemours and Co.) were dissolved in enough water to yield a total volume of 160 milliliters of solution. The selected ink (150 milliliters) was slowly added to the above agitated aqueous solution. Agitation was continued to disperse the ink in the aqueous vehicle until the desired drop size was obtained. An additional 50 milliliters of 11 percent gum arabic solution was added to induce coacervation of the polymeric capsule wall material which envelopes the ink droplets. The contents of the "Blendor" cup were transferred to a 1500-milliliter beaker by means of decantation and washing with 400 milliliters of 2.5 percent urea solution. The urea in the wash-water serves as an anti-aggregation agent for the now-formed capsules. With continued agitation, the contents of the beaker were chilled to 15 degrees centigrade and treated by the slow addition of 160 milliliters of an aqueous solution containing 9.6 grams of resorcinol and 0.4 gram of gallic acid. Following the addition, the mixture was stirred for an additional 40 minutes. The pH of the mixture was then adjusted to less than 2.0 by the addition of 60 milliliters of 10 percent, by volume, aqueous sulfuric acid. After 5 minutes of additional stirring, 60 milliliters of 37 percent aqueous formaldehyde was added. The mixture was then stirred overnight at room temperature and then one more hour at 45 degrees centigrade. The mixture was cooled to room temperature and suction-filtered to isolate the capsules.

(b) Gelatin wall-material capsules

An aqueous emulsion having oil marking material droplets of 5 to 6 microns diameter was prepared by stirring in a Waring "Blendor" the following materials at 55 degrees centigrade:

208 grams of the selected oily ink formulation
135 grams of 11 percent aqueous gelatin (isoelectric point at pH 8)
74 grams of water.

The emulsion was placed in a beaker with continual stirring, and the pH of the stirred emulsion was adjusted to 9 with a 20 percent, by weight, aqueous solution of sodium hydroxide. To the stirred emulsion were then added 11 grams of a 5 percent, by weight, aqueous solution (pH adjusted to 8 with 20 percent sodium hydroxide) of poly(methyl vinyl ether-maleic-anhydride) copolymer such as a "Gantrez AN" copolymer with a specific viscosity (1 gram of copolymer in 100 milliliters of butanone and determined at 25 degrees centigrade) of 0.9 to 1.0 poise as supplied by General Aniline And Film Corporation, New York, N.Y., 91 grams of an 11 percent, by weight, aqueous solution of gum arabic and 655 grams of hot (approximately 65 degrees centigrade) water. At this point, the temperature of the mixture was adjusted to 55 degrees centigrade, and the pH was again adjusted to 9. Then, with the mixture under continuous agitation, the following steps were taken: (1) 13.5 milliliters of 14 percent, by weight, aqueous acetic acid was added dropwise, (2) the mixture was cooled to 12 degrees centigrade and treated with 7.5 milliliters of 25 percent, by weight, aqueous glutaraldehyde, (3) one hour later, 15 milliliters of a 5 percent, by weight, aqueous solution of poly(methyl vinyl ether-maleic-anhydride) copolymer (at pH 8) was added dropwise, and finally (4) one half-hour after the preceding addition was complete, the pH was raised to 10 with 20 percent sodium hydroxide solution.

The now-completed capsule units thus prepared may be isolated from the vehicle by decantation, centrifugation, or filtration, washed, and dried, or more conveniently used without isolation as a suspension in the aqueous manufacturing vehicle.

The above procedure gives small aggregates of capsules. An alternative procedure for use when single, non-aggregated capsules are desired is the procedure of I. L. Yurkowitz, disclosed in U.S. Pat. 3,533,958 which issued Oct. 13, 1970. Generally, for the best operation in this invention, non-aggregated capsules should be about 10 to 15 microns in diameter.

(c) Capsules having hydrophobic wall material

Aqueous inks such as those of Examples 1(q) and 1(r) were encapsulated according to the procedure of Powell et al., U.S. Pat. 3,415,758 which issued Dec. 10, 1968. The procedure of Example 7 of the Powell et al. patent was used here.

EXAMPLE 3

Paper coating formulations (a) This is the preferred example for the general uses disclosed herein. For specialized uses that depend on different colors or types of inks or that depend partly on porous or semi-translucent papers, appropriate substitutions for the materials of this example may be made.

The ink of formulation (f), Example 1, was encapsulated according to procedure (a) of Example 2 and included in the following paper-coating slurry formulation:

|  | Parts | |
|---|---|---|
|  | Dry | Wet |
| Capsules | 40 | 145 |
| Uncooked arrowroot starch granules | 30 | 30 |
| Starch binder material | 6 | 60 |
| "Asbestos R G-144" fibers | 1 | 1 |

The "Asbestos RG-144" used here is a resin grade cationic chrysotile asbestos sold by Union Carbide Corporation, 270 Park Ave., New York, N.Y.

The coating slurry was applied, with a No. 40 Mayer rod, to 11-pound bond paper stock such as Mead 11-pound "Copy Cote" bond, sold by the Mead Corporation, Dayton, Ohio. The freshly-laid coat was dried with a hot-air gun as indicated in Example 5.

In the above formulation, and in all the formulations of this specification, unless otherwise indicated, the difference between the dry weight added and the wet weight added is the weight of added water associated with that addition.

(b) The above preferred coating formation was varied by putting the 40 parts (dry) of capsules in less water so as to give only 133 parts (wet) and by increasing the asbestos fiber content to 3 parts (wet and dry). No significant difference was discernible in the performance of papers coated with this variation and those coated with the above preferred formulation.

EXAMPLE 4

Variations in filler materials

Eight different filler materials were used in formulations of the types shown in Example 3. Each filler material was added to the basic formulation (below) in two different quantities to give sixteen formulations, eight formulations with high filler loads and eight with low filler loads. The two different quantities of each filler material represent a useful range for that specific filler material to give coating formulations of good dry-coat function and good wet-coating rheology, fluid enough to spread easily, but thick enough to stand up stiffly during the drying process. The basic formulation is as follows:

|  | Parts | |
|---|---|---|
|  | Dry | Wet |
| Capsules | 40 | 120 |
| Starch binder | 6 | 60 |
| "Asbestos R G-144" (thixotropic agent) | 1 | 1 |

Filler materials added to the basic formulation are as follows:

|  | High load | | Low load | |
|---|---|---|---|---|
|  | Parts (dry) | Parts (wet) | Parts (dry) | Parts (wet) |
| PMMA foamed microspheres | 5 | 65 | 1 | 61 |
| "Saran" foamed microspheres | 2.5 | 62.5 | 0.5 | 60.5 |
| "Corcel" hollow glass spheres (<125 microns diameter) | 20 | 80 | 4 | 64 |
| "Pulvazon" vermiculite | 16.5 | 76.5 | 5.5 | 65.5 |
| 40-mesh styrene-divinyl benzene copolymer beads | 100 | 180 | 10 | 70 |
| "Aviamide-6" | 12 | 72 | 4 | 64 |
| Arrowroot starch granules | 45 | 58 | 15 | 28 |
| 'Solka-Floc" alpha-cellulose fibers | 12 | 72 | 3 | 65 |

All of the filler materials listed above are obtained in a dry state and may be added dry to the basic formulation. The order of addition of the materials is not important. For instance, the 60 parts of water, indicated in the "high-load" formulation column as accompanying 5 parts of PMMA foamed microspheres, may be added before, after or with the foamed microspheres.

The PMMA foamed microspheres used here are hollow spheres of poly(methylmethacrylate) having a size range of 10 microns to 30 microns in diameter and are sold by the Dow Chemical Company of Midland, Mich.

The "Saran" foamed microspheres used here were also bought from the Dow Chemical Company and are hollow spheres of 10 microns to 30 microns in diameter of poly(vinylidine chloride)-polyacrylonitrile copolymer.

The "Corcel" hollow glass spheres used here are of the size specified and were bought from Interpace Corporation, Box 1111, Parsippany, N.J.

The styrene-divinylbenzene copolymer beads used here are solid beads of the specified mesh, bought from the Dow Chemical Company.

The "Pulvazon" vermiculite used here is a pulverized mica powder bought from W. R. Grace and Company, Zonolite Division, Travelers Rest, S.C.

The "Aviamide-6" is a 50–100 angstrom diameter grade of micro-crystalline nylon bought from FMC Corporation, 633 3rd Ave., New York, N.Y.

"Solka-Floc" is a short fiber alpha-cellulose material supplied by Brown Company, 277 Park Ave., New York, N.Y.

The first four of the above filler materials, PMMA foamed microspheres, "Saran" foamed microspheres, "Corcel" hollow glass spheres and "Pulvazon" vermiculite, are examples of filler material particles that incorporate available free space internally in their own structure. That is to say, these four materials collapse or yield under pressure to allow movement of neighboring ink capsules without rupture of said capsules.

The proper functioning of the last four of the above filler materials, the copolymer beads, "Aviamide-6," arrowroot starch granules and alpha-cellulose fibers, is completely or nearly completely dependent on the free air space incorporated in the dry-coat structure between the bits of the dried coat.

EXAMPLE 5

Coated record material sheets

The coating formulations of Example 4 were coated on paper sheets with a No. 40 Mayer rod and dried with a hand-held hot-air gun set to an air-temperature at the muzzle of 200 degrees Fahrenheit and moved about at a distance of one to three inches above the wet coated paper surface. The hot-air gun used here is of the type sold by the Master Appliance Corporation of Racine, Wis., as Model No. HC-201. All of the coatings set to a dry appearance within a few seconds and were ready for use after about one to three minutes drying time.

All of the coatings gave acceptable, functional sheets of record material. The different filler materials affected the finish of the coatings to give usefully different variations.

Arrowroot starch and "Pulvazon" formulations gave remarkably smooth coatings with the high filler load formulations giving surfaces with a softer "hand" than the low filler loads.

PMMA and "Saran" foamed microsphere formulations gave very low density coatings with a suede-like, non-slip finish.

Styrene-divinylbenzene coatings were of intermediate smoothness.

"Corcel" formulations gave low-density coatings (compared to the other filler materials of Example 4) with the texture of extremely fine-grained sandpaper.

"Aviamide" formulations generally gave a somewhat rough-textured coating.

EXAMPLE 6

Variations in thixotropic agents

Twenty different formulations using the capsules of Example 3, were made up with two loadings of ten different thixotropic agents. The two different quantities of each thixotropic agent represent a useful range for that specific thixotropic agent to give coating formulations of good dry-coat function and good wet-coating rheology.

The basic formulation is as follows:

|  | Parts | |
|---|---|---|
|  | Dry | Wet |
| Capsules | 40 | 120 |
| Arrowroot starch granules | 30 | 30 |
| Starch binder | 6 | 60 |

Thixotropic agents added to the basic formulation are as follows:

|  | High load | | Low load | |
|---|---|---|---|---|
|  | Parts (dry) | Parts (wet) | Parts (dry) | Parts (wet) |
| "Asbestos RG-144" | 3 | 16 | 1 | 14 |
| "Zetabestos" | 3 | 16 | 1 | 14 |
| "Asbestos T" | 3 | 16 | 1 | 14 |
| "Aerosol COK-84" | 6 | 66 | 2 | 62 |
| "Bentonite 625" | 5 | 65 | 1 | 61 |
| Gum ghatti | 11 | 110 | 4 | 40 |
| "Kelzan" | 3 | 150 | 1 | 50 |
| Ropey karaya gum | 2 | 100 | 0.5 | 25 |
| "Benefite M-11" | 5 | 100 | 1 | 20 |
| Kelgum | 2 | 100 | 1 | 50 |

As pointed out for the materials of Example 4, those materials in the above formulations which are obtained in a dry state may be added dry to the formulation. The required water may be added to the formulation at any time.

Of the thixotropic agents, the first five listed in the table are thixotropic filler materials and the last five are thixotropic binder materials.

"Zetabestos" is a cheap, paper-making grade of chrysotile asbestos sold by Carey-Canadian Mines, Ltd., Cincinnati, Ohio.

"Asbestos T" is a paper-making grade of chrysotile asbestos (having titanium dioxide uniformly distributed by precipitation on the asbestos fibers) sold by Union Carbide Corporation.

"Aerosil COK-84" is a micro-fine, hydrophilic, silica powder sold by Degussa, Inc., 609 Schuyler Ave., Kearny, N.J.

"Bentonite 625" is a high-swelling grade of bentonite clay sold by New Jersey Zinc Company, 160 Front St., New York, N.Y.

The gum ghatti is a low viscosity, natural, hydrocolloid gum which was bought from Morningstar-Paisley, Incorporated, 630 W. 51st St., New York, N.Y.

"Kelzan" is a polysaccharide xanthan gum made by Kelco Company, 75 Terminal Ave., Clark, N.J.

The ropey karaya gum used here was bought from Stein, Hall and Company, Inc., 605 3rd Ave., New York, N.Y., and is a stringy natural hydrocolloid of high viscosity and high anionic charge.

The "Benefite M-11" is a micro-fine polyacrylamide powder bought from Morningstar-Paisley, Inc. "Benefite M-11," used in this example and Example 15, is now available under the trade name "Tychem 8011" from Standard Brands Chemical Industries, Inc., P.O. Drawer K, Dover, Del. 19901.

"Kelgum" is a water-soluble polysaccharide gum made by Kelco Company.

EXAMPLE 7

Coated record material sheets

The formulations of Example 6 were coated onto paper sheets with a No. 40 Mayer coating rod and dried as in Example 5 to give functional sheets of good appearance.

The bentonite sheets had the smoothest hand with the karaya gum sheets next in smoothness. The "Kelzan" formulation showed the shortest flow properties and was difficult to dry.

EXAMPLE 8

Variations in binder materials

Twenty-two different formulations, using the capsules of Example 3, were made up with two loadings of eleven different binder materials. The two different quantities of each binder material represent a useful range for that specific binder material to give good dry-coat function and good wet-coating rheology.

The basic formulation is as follows:

|  | Parts | |
|---|---|---|
|  | Dry | Wet |
| Capsules | 40 | 120 |
| Arrowroot starch granules | 30 | 30 |
| "Asbestos RG-144" | 1 | 1 |

Binder materials added to the basic formulation are as follows:

|  | High load | | Low load | |
|---|---|---|---|---|
|  | Parts (dry) | Parts (wet) | Parts (dry) | Parts (wet) |
| "Penford Gum 260" starch | 12 | 120 | 4 | 100 |
| "Elvanol 71-30" | 9 | 180 | 1 | 80 |
| 1:1 "Elvanol 71-30"-"Penford Gum 260" | 9 | 135 | 4 | 90 |
| 2:1 "Elvanol 71-30"-"Dow Latex 620" | 6 | 84 | 2 | 57 |
| 2:1 "Elvanol 71-30"-"Ucar 40" | 6 | 84 | 2 | 57 |
| 2:1 "Penford Gum 260"-"Ucar 40" | 10 | 74 | 3 | 52 |
| 2:1 "Ucar 40"-casein | 10 | 127 | 3 | 101 |
| 2:1 "Ucar 40"-soy protein | 10 | 127 | 3 | 101 |
| Casein | 6 | 130 | 2 | 103 |
| 1:1 Gelatin-gum arabic coacervate | 10 | a 71 | 2 | 54 |
| 1:1 Hexylene glycol borate "Elvanol 50-42" coacervate | 10 | 84 | 2 | 57 | a 20 parts of water were removed from the capsule suspension before formulation.

NOTE.—"Penford Gum 260" is a gelatinized, medium viscosity hydroxyethyl ether of cornstarch sold by Penick and Ford, Ltd., Inc. of 750 3rd Ave., New York, N.Y.; "Dow Latex 620" is a soft styrene-butadiene latex sold by the Dow Chemical Company. "Ucar 40" is a soft styrene-acrylic latex sold by Union Carbide Corporation; Hexylene glycol borate, which is 2-methylpentanediol-2,4 borate, was prepared according to the method of U.S. Pat. 2,741,548 of S. Darling et al. which issued Apr. 10, 1956.

EXAMPLE 9

Coated record material sheets

The formulations of Example 8 were coated onto paper sheets with a No. 40 Mayer coating rod and dried as in Example 5 to give good, functional, coated sheets.

"Penford Gum 260" formulations, "Elvanol 71-30" and mixtures of the two, gave coatings which could be washed off with water. Both of these binder materials gave good film cohesion. "Elvanol 71-30" gave stronger adhesion to the paper stock and tended to oil-proof the base stocks so that, in use, ink transmission through the sheet was decreased.

The latex binders gave better adhesion to the paper substrate than starch or poly(vinyl alcohol) did. The latex binders also generally gave slurries of lower viscosity so that higher solids slurries could be more readily compounded and coated.

The two examples of coacervate binders gave good film cohesion and good adhesion to the paper substrate. The wetting properties of the coacervate binders were such as to allow the ready use of slurries having unusually high-solids content without resort to the non-solution latex binders.

The coatings which included casein binder material showed fair adhesion and cohesion but were somewhat brittle.

EXAMPLE 10

Variations in formulation vehicle

A series of eight coating formulations, using the capsules of Example 3, were made up with vehicles other than water alone. A change in the vehicle also necessitated a change in the dissolved binder material. Eight different vehicle-binder combinations were added to a basic formulation to give the eight variations.

The basic formula is as follows:

|  | Parts | |
| --- | --- | --- |
|  | Dry | Wet |
| Capsules in water | 40 | 70 |
| Arrowroot starch granules | 30 | 30 |
| "Asbestos RG-144" | 1 | 1 |

Vehicle-binder combinations added to the basic formulation are as follows:

|  |  | High binder load | | Low binder load | |
| --- | --- | --- | --- | --- | --- |
|  |  | Parts (dry) | Parts (wet) | Parts (dry) | Parts (wet) |
| 1 | Polyvinyl acetate in toluene | 25 | 325 | 10 | 194 |
|  | Ethanol* |  | 70 |  | 70 |
| 2 | Polybutadiene in toluene | 20 | 400 | 5 | 200 |
|  | Ethanol* |  | 50 |  | 40 |
| 3 | Crepe rubber in toluene | 22.5 | 340.5 |  |  |
|  | Ethanol* |  | 40 |  |  |
| 4 | Cellulose hydroxyethyl ether in toluene | 25 | 539 | 15 | 439 |
| 5 | Shellac in ethanol | 12 | 164 | 7 | 129 |
| 6 | Cellulose acetate butyrate (½ second) in 9:1 toluene-ethanol | 12 | 100 | 6 | 50 |
|  | 1:1 toluene-ethanol |  | 244 |  | 214 |
| 7 | "Elvax 40" in xylene | 12 | 210 | 6 | 160 |
|  | Ethanol* |  | 90 |  | 100 |
| 8 | Ethyl cellulose in cyclohexane | 12 | 240 | 6 | 120 |
|  | Isopropanol* |  | 100 |  | 120 |

*See second paragraph below for explanation.

In this example, the difference between the dry weights and the wet weights indicated in the formulations is the weight of solvent or suspension vehicle specified.

The capsules as used here were filtered to give a wet cage (40 parts capsules, 30 parts water). The capsules may be air-dried to remove the 30 parts of water, in which case the solvents which are indicated (*), may be omitted from the formulation.

"Elvax 40" is a wax-compatible vinyl polymer sold by E. I. du Pont de Nemours, Inc., Wilmington, Del.

EXAMPLE 11

Coated record material sheets

The formulations of Example 10 were coated onto paper sheets with a No. 40 Mayer coating rod and dried as in Example 5 to give good, functional, coated sheets.

The toluene-poly(vinylacetate) formulation gave a paper coating with high anti-smudge characteristics and tends to make the paper substrate translucent. This formulation performs better when coated on plastic film substrates than it does when coated on paper.

The shellac formulation was readily applied and gave a very smooth coat which showed good smudge resistance and good ink transmission. For use on paper substrates, the shellac formulation compared favorably to the formulation of Example 3 and was preferred over the other non-aqueous formulations of this example.

The poly-butadiene formulation worked better on plastic films than on paper where its poor adhesion to the paper stock gave a coating that transferred like a carbon paper "release coating."

The crepe rubber coating also showed poor adhesion to paper stocks when freshly coated. The adhesion improved on aging.

EXAMPLE 12

The coating of substrates other than paper

A variation of the coating formulation of Example 3(a) was coated with a No. 40 Mayer rod onto a substrate sheet of "Mylar EB-92" which is a special water-receptive polyethylene terephthalate resin sheet obtainable from E. I. du Pont de Nemours and Co., Inc. of Wilmington, Del. The formulation of Example 3(a) was varied in that an additional 3 parts of asbestos fiber material was added.

This coated Mylar sheet was flexible and non-smudging and when used as a typewriter ribbon gave sharp, legible type-copy. The same area of the coated film could be struck with type as many as 40 times before the ink supply of the coating was exhausted.

Alternatively, similar coated sheets were made by coating formulas 1 and 2 of Example 10 on "Mylar EB-92" sheets.

Felted sheets of glass fibers made particularly useful and versatile record material sheets when coated with the coating formulations of this invention. The coating slurry of Example 3(a) and the shellac-containing formulation of Example 10 were both readily coated onto glass-felt sheets. These coated glass-felt sheets were porous and non-absorbing and gave excellent ink transmission, both through the coated sheet and directly to immediately adjoining surfaces.

Sheets of polystyrene synthetic paper (such as that sold by Crown Zellerbach Corporation, 1 Bush St., San Francisco, Calif. 94199) were found to be sufficiently porous to allow the use of either water-based or oil-based ink-containing coatings to operate thereon in business forms such as those shown in FIGS. 1 and 2.

EXAMPLE 13

Coat with asbestos fibers as only solid filler material

The following materials were mixed to give a coating slurry:

|  | Dry | Wet |
| --- | --- | --- |
| Capsules | 40 | 178 |
| Starch binder | 6 | 60 |
| "Asbestos RG-144" | 4 | 4 |

23

The slurry was coated on 11-pound bond stock with a No. 40 Mayer rod and dried to give record material comparable to that of Example 3(a) in typewriter printing intensity but slightly more prone to smudge than the record material of Example 3(a).

EXAMPLE 14

Record material with coat having starch granules and binder-encased air-bubble wall-material as filler material The coating slurry formulation of Example 3(a) was modified by the substitution of 6 parts of "Elvanol 50–42" for the 6 parts of starch binder material. The modified slurry was then beaten in a Waring "Blendor" until enough air had been whipped into the slurry to approximately double its volume and then coated without delay by a coating rod in the usual manner. By this method, thicker coats of lighter weight were obtained. These coats were as good or better than the coats of Example 3 with regard to antismudge characteristics but, as would be expected, gave lower typewriter intensities. The addition of air bubbles as filler material effectively dilutes the ink droplet concentration on the paper. This concentration must be increased to allow for the dilution in space by voids when comparable typewriter intensities are desired.

EXAMPLE 15

Record material with coat having water-soluble thixotropic binder material and no solid filler material An aqueous slurry of the following composition was prepared.

|  | Parts | |
|---|---|---|
|  | Dry | Wet |
| Capsules | 40 | 40 |
| Poly(vinyl alcohol) | 9 | 90 |
| "Benefite M-11" (thixotropic agent) | 3 | 100 |

The slurry was coated on 11-pound bond stock with a No. 50 Mayer rod and dried to give record material of unusually good print intensity, print sharpness and smudge resistance.

EXAMPLE 16

Record material with white overcoat

The coated record material of Example 3 was further coated with a white adsorbent clay masking coat applied over the black-capsule coat. The clay coat was applied as an aqueous slurry with a No. 10 Mayer rod and dried as usual with a hot air gun. The clay slurry was applied with a solids content of 28 percent with 5 percent added poly(vinyl alcohol) binder. The preferred adsorbent clay for this use is kaolin.

When the coated side of the record material of this example was typed on directly with an uninked type face, sharply delineated characters of good contrast against the white clay were produced by rupture of the capsules and expulsion of the ink into the clay overcoat.

A similar record material was made using a collapsible non-adsorbent overcoat of styrene-maleic anhydride foam. The method of making and applying a foam material of the type used here is taught by Frank J. Hahn in U.S. Pat. No. 2,647,094 which issued July 28, 1953.

EXAMPLE 17

Record material with laminated coat and two inks

Two coating slurries were made according to the method of Example 3(a)—one coating having capsules made according to the method of Example 2(a) with the green ink of Example 1(c) as the internal phase and the other identical except the capsule internal phase was the red ink of Example 1(b). The slurry which included the green ink-containing capsules was coated onto 11-pound bond paper stock wtih a No. 40 Mayer rod and dried.

24

The red-ink-containing capsule slurry was then similarly applied over the first coat to give a transfer sheet with a laminated coating. This record sheet was then coupled with a plain bond receiving sheet facing the coated side of the transfer sheet. When the uncoated side of the transfer sheet was typed on with an uninked type face, a green print appeared on the uncoated surface of the transfer sheet and a red print appeared on the plain bond receiving sheet. Some mixing of the inks was observed such that the green was a gray-green and the red was a brownish red. This mixing of the colors was readily prevented by the application of a poly(vinyl alcohol) coat over the green capsule coat prior to the application of the red capsule coat.

EXAMPLE 18

Record materials with colorless dye-precursor material

The Crystal Violet Lactone (CVL) ink of Example 1(j) was encapsulated according to the procedure of Example 2(b) and made up into a coating formulation according to the procedure of Example 3(a). The coating formulation was coated on paper and dried according to the procedure of Example 5 to give record material that yielded a blue color when used as a transfer sheet against a receiving sheet sensitized with p-phenylphenol-formaldehyde resin in the form of a couplet unit of two sheets. Sensitization of such pressure-sensitive couplet units employing phenolic resins is taught and claimed in Canadian Pat. 768,039 which issued Sept. 26, 1967 on application of Robert E. Miller and Paul S. Phillips, Jr. When the transfer-receiving sheet couplet described in the above patent was also sensitized with a pheonlic-resin coat on the writing surface, that is, the side of the transfer sheet opposite the CVL containing coat, writing pressures on the now-sensitized surface gave two copies of the writing pattern by expression of part of the CVL ink up through the transfer sheet for viewing on the written-on surface and part in the usual manner to the sensitized surface of the receiving sheet of the couplet.

Similarly-functioning record materials were made up by sensitizing sheets of paper with CVL to give a receiving surface and making a transfer sheet as above except using the phenolic-resin ink of Example 1(k), encapsulated according to the procedure of Example 2(a).

EXAMPLE 19

Water-based ink capsule coating formulation

The water-based ink of formulation (g), Example 1, was encapsulated according to the procedure of Example 2(c). The finished microcapsules were suction filtered and washed free with xylene to give dry free-flowing capsules. The xylene-washed capsules were included in the following paper-coating formulation:

| | Parts |
|---|---|
| Capsules | 7.0 |
| Arrowroot starch | 3.5 |
| Elvacite 2044 (25% in xylene) | 6.0 |
| Xylene | 8.0 |

The Elvacite 2044 used here is a high molecular weight n-butyl methacrylate polymer as sold by E. I. du Pont de Nemours & Co., Inc., Wilmington, Del. 19898.

The slurry was coated on 11-pound bond stock with a No. 50 Mayer Rod and dried as in Example 5, to give an acceptable, functional sheet of record material.

The green, non-pigmented dye print obtained from the above sheet of record material was hydrophilic in character and could not be wet by oil.

What is claimed is:

1. Pressure-responsive coated record material comprising a substrate sheet and a compressible and collapsible coating on a surface of said substrate sheet wherein said coating comprises pressure-collapsible binder material and minute, pressure-releasable, individually-isolated, droplets of marking liquid wherein said droplets are randomly dispersed throughout the coating and are spaced on the average at least about one average droplet-radius apart, wherein a substantial portion of the space between the droplets is unfilled and left as free-space voids, wherein said binder material binds said isolated droplets to each other and to said substrate sheet surface, and wherein said coating is at least about twice as thick as the average diameter of said droplets, and wherein said coating is resilient under light pressure and may be collapsed and tightly packed at areas of impact without releasing said marking liquid droplets, and wherein heavy pressure associated with printing or writing will irreversibly compress said coating and release said marking liquid.

2. The record material of claim 1 wherein the coating further comprises minute filler material bits randomly interspersed with the droplets and occupying part of the space between the droplets.

3. The record material of claim 2 wherein the minute filler material bits are solid particles.

4. The record material of claim 3 wherein the particles are starch granules.

5. The record material of claim 2 wherein the minute filler bits are at least in part solid film wall material substantially enclosing intact gas bubbles.

6. The record material of claim 5 wherein part of the filler bits are starch granules.

7. The record material of claim 5 wherein said solid film material is part of the binder material.

8. The record material of claim 1 wherein said binder material is pre-set poly(vinyl alcohol) binder material.

9. The record material of claim 1 wherein the binder material is the solid remnants of a reticulated foam.

10. The record material of claim 2 wherein the binder material is the solid remnants of a reticulated foam.

11. The record material of claim 2 wherein at least part of the minute filler material bits are particles of a thixotropic agent.

12. The record material of claim 11 wherein the particles of thixotropic agent are microscopic fibers of asbestos.

13. The record material of claim 1 wherein at least part of the binder material is a thixotropic agent.

14. The record material of claim 2 wherein at least part of the binder material is a thixotropic agent.

15. The record material of claim 1 wherein the isolated marking liquid droplets are isolated as the core-material of pressure-rupturable microcapsules.

16. The record material of claim 15 wherein the microcapsules have wall material comprising gelatin.

17. The record material of claim 15 wherein the capsule wall material comprises poly(vinyl alcohol)-phenol-formaldehyde resin material.

18. The record material of claim 1 wherein the substrate sheet is paper.

19. The record material of claim 1 wherein the substrate sheet is a polymeric film material.

20. The record material of claim 19 wherein the polymeric film material is polyethylene terephthalate.

21. The record material of claim 1 wherein the marking liquid is a pigmented ink.

22. The record material of claim 21 wherein the pigment comprises a black pigment selected from the group consisting of graphite and carbon black.

23. The record material of claim 21 wherein the pigment comprises magnetic material.

24. The record material of claim 21 wherein the marking liquid comprises fluorescent material.

25. The record material of claim 1 wherein the marking liquid comprises a colorless chromogenic material.

26. The record material of claim 25 wherein the colorless chromogenic material comprises Crystal Violet Lactone.

27. The record material of claim 1 wherein the coated face of the record material bears an overcoat of light-diffracting polymer foam.

28. The record material of claim 1 wherein the coated face of the record material bears a marking overcoat of white pigment.

29. A couplet record sheet material form having a first record material sheet superimposed on a second record material sheet, wherein said first record material sheet has on that surface of said first sheet which opposes said second sheet a compressible and collapsible coating comprising pressure-collapsible binder material and minute, pressure-releasable, individually-isolated, droplets of marking liquid wherein said droplets are randomly dispersed throughout the coating and are spaced on the average at least about one average droplet-radius apart, wherein a substantial portion of the space between the droplets is unfilled and left as free-space voids, wherein said binder material binds said isolated droplets to each other and to said substrate sheet surface, and wherein said coating is at least about twice as thick as the average diameter of said droplets, and wherein said coating is resilient under light pressure and may be collapsed and tightly packed at areas of impact without releasing said marking liquid droplets, and wherein heavy pressure associated with printing or writing will irreversibly compress said coating and release said marking liquid.

30. A triplet record sheet material form wherein the couplet form of claim 29 is mated with a third record material sheet.

31. The triplet record sheet material form of claim 30 wherein said couplet form is superimposed on said third record material sheet with said second and third sheets opposed.

32. The triplet record sheet material form of claim 30 wherein said third record material sheet is superimposed on said couplet form with said first and third sheets opposed.

33. The couplet record sheet material form of claim 29 wherein said ink is a pigment ink.

34. The couplet record sheet material form of claim 29 wherein the liquid ink droplets consist of droplets of colorless chromogenic marking liquid and droplets of sensitizing co-reactant marking liquid which in use mix to give color-development.

35. The couplet record sheet material form of claim 29 wherein said ink is a colorless chromogenic ink and at least one of said first and second sheets are chemically sensitized to develop the color of said ink.

36. The triplet record sheet material form of claim 30 wherein said ink is a pigment ink.

37. The triplet record sheet material form of claim 30 wherein said ink is a colorless chromogenic ink and at least one of said first, second, and third sheets is chemically sensitized to develop the color of said ink.

References Cited

UNITED STATES PATENTS

| | | | |
|---|---|---|---|
| 3,020,171 | 2/1962 | Bakan et al. | 117—36.1 |
| 3,427,971 | 2/1969 | Steber et al. | 117—36.1 |
| 3,472,674 | 10/1969 | Kite | 117—36.1 |
| 3,481,759 | 12/1969 | Ostlie | 117—36.2 |

MURRAY KATZ, Primary Examiner

U.S. Cl. X.R.

117—36.1, 36.2, 36.4, 155 UA